(12) United States Patent
Papazova et al.

(10) Patent No.: US 7,934,059 B2
(45) Date of Patent: Apr. 26, 2011

(54) METHOD, SYSTEM AND COMPUTER PROGRAM PRODUCT FOR PREVENTING LOCKOUT AND STALLING CONDITIONS IN A MULTI-NODE SYSTEM WITH SPECULATIVE MEMORY FETCHING

(75) Inventors: Vesselina K. Papazova, Highland, NY (US); Michael A. Blake, Wappingers Falls, NY (US); Pak-kin Mak, Poughkeepsie, NY (US); Arthur J. O'Neill, Jr., Wappingers Falls, NY (US); Craig R. Waters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/021,781

(22) Filed: Jan. 29, 2008

(65) Prior Publication Data

US 2009/0193198 A1    Jul. 30, 2009

(51) Int. Cl.
*G06F 12/08* (2006.01)
(52) U.S. Cl. ........ 711/141; 711/137; 711/146; 711/147; 711/204
(58) Field of Classification Search .................. 711/137, 711/141, 146–147, 204, E12.038, E12.026
See application file for complete search history.

(56) References Cited

U.S. PATENT DOCUMENTS

| 6,467,032 | B1 | 10/2002 | Lippert |
| 6,954,829 | B2 | 10/2005 | Beers et al. |
| 2004/0122966 | A1 | 6/2004 | Hum et al. |
| 2005/0275658 | A1 | 12/2005 | Sasaki et al. |
| 2009/0089510 | A1* | 4/2009 | Lee et al. ...................... 711/141 |

OTHER PUBLICATIONS

Principles of Operation PA-compressed, split 1.
Principles of Operation PA-compressed, split 2.
Principles of Operation PA-compressed, split 3.
Principles of Operation PA-compressed, split 4.

* cited by examiner

*Primary Examiner* — Jasmine Song
(74) *Attorney, Agent, or Firm* — Cantor Colburn LLP; John Campbell (57) ABSTRACT

A method of preventing lockout and stalling conditions in a multi-node system having a plurality of nodes which includes initiating a processor request to a shared level of cache in a requesting node, performing a fabric coherency establishment sequence on the plurality of nodes, issuing a speculative memory fetch request to a memory, detecting a conflict on one of the plurality of nodes and communicating the conflict back to the requesting node within the system, canceling the speculative memory fetch request issued, and repeating the fabric coherency establishment sequence in the system until the point of conflict is resolved, without issuing another speculative memory fetch request. The subsequent memory fetch request is only issued after determining the state of line within the system, after the successful completion of the multi-node fabric coherency establishment sequence.

20 Claims, 6 Drawing Sheets

METHOD, SYSTEM AND COMPUTER PROGRAM PRODUCT FOR PREVENTING LOCKOUT AND STALLING CONDITIONS IN A MULTI-NODE SYSTEM WITH SPECULATIVE MEMORY FETCHING

BACKGROUND OF THE INVENTION

This invention relates to a speculative memory fetching method, and more particularly to providing a method, system and computer program product for preventing lockout and stalling conditions in a multi-node system with speculative memory fetching.

Computer systems have developed from a single processor system to a large symmetric multi-processor system (SMP) that is commonly found in today's corporate infrastructure. An SMP system can be defined as a multiprocessor computer system where two or more identical processors are connected to a single shared main memory. As these systems have evolved, methods for improving processor request response times have been a critical part of the design process for these systems.

In existing large SMP systems, while processor frequency and overall system performance has grown dramatically, memory response times have not matched these rates of improvement. In order to overcome this problem, SMP systems include algorithms such as multi-level caching, processor/hardware initiated pre-fetching, and software pre-fetching hints. Although, the use of these algorithms increase the overall system performance, each one has failed to address unique issues present in large SMP systems. For example, in large SMP systems, multiple levels of caches are interconnected vertically from the processor to the memory (referred to as processor stacks or nodes). These vertical processor stacks or nodes interconnect with other vertical processor stacks or nodes via one of the shared levels of caches.

Figure 1:
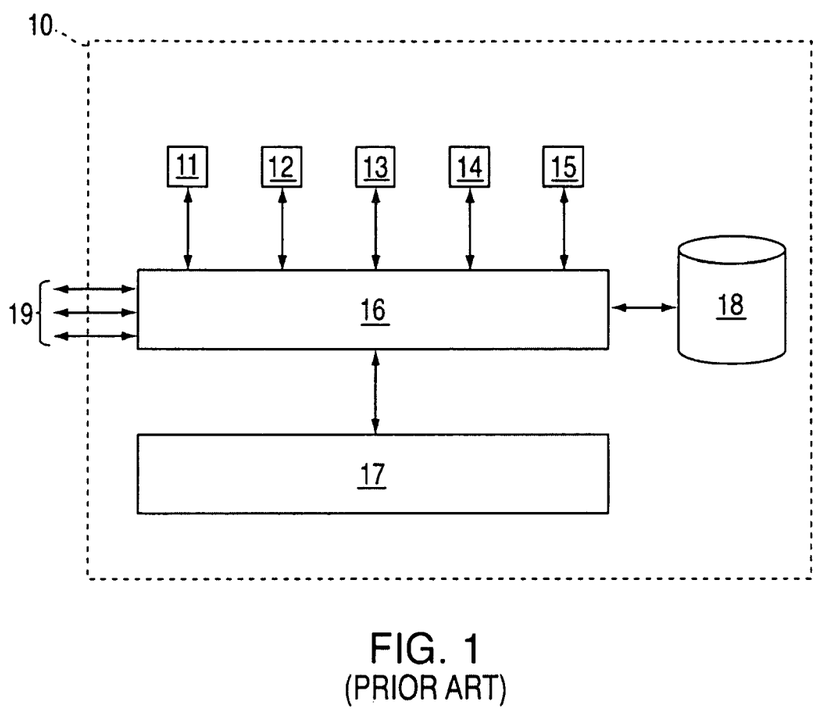
FIG. 1 is a diagram illustrating a conventional node of a multi-node system.
Figure 2:
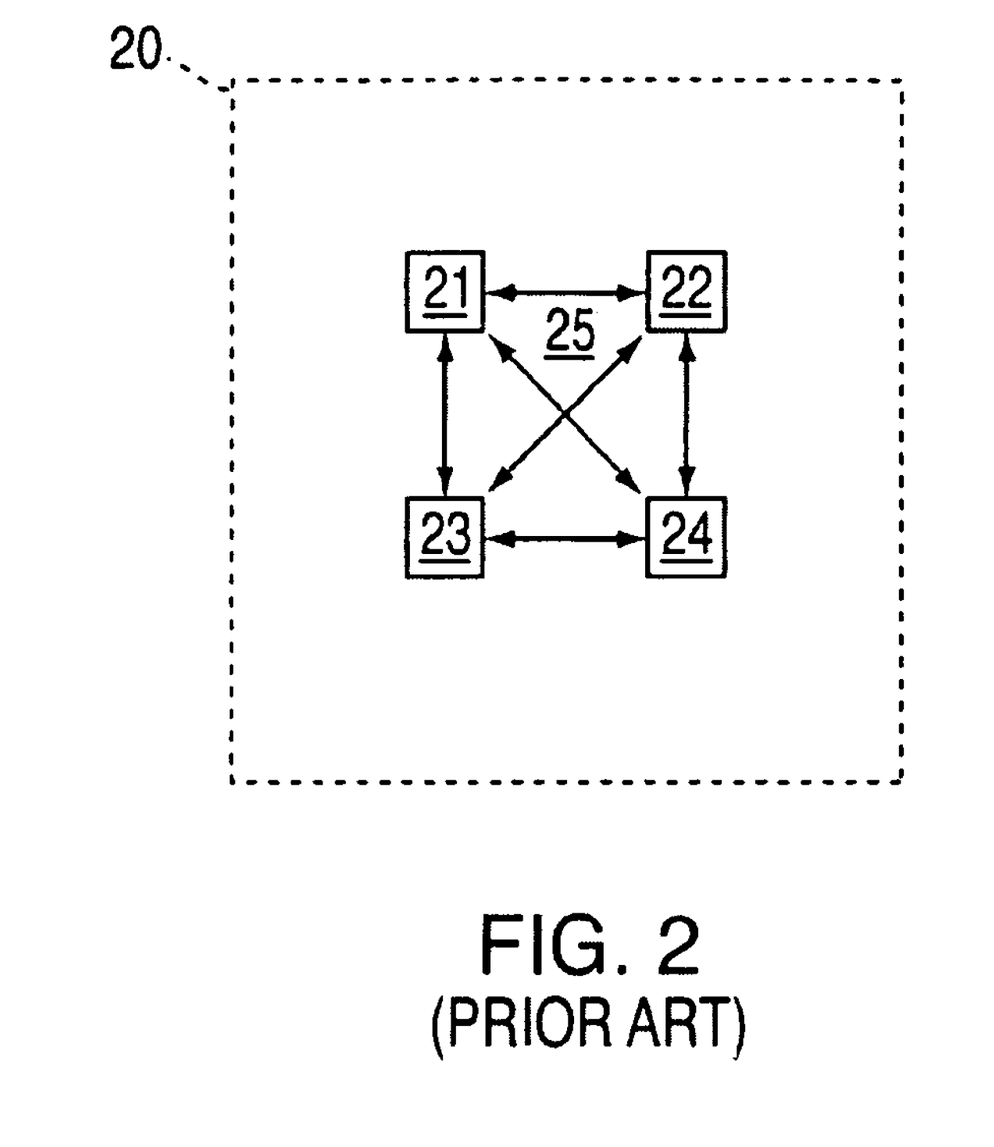
FIG. 2 is a diagram illustrating a conventional multi-node system.

FIG. 1 illustrates a conventional node 10 including a plurality of processors 11, 12, 13, 14 and 15 interconnected by a shared level cache 16 with a storage/memory 17 shared among the processors (11, 12, 13, 14 and 15) and common I/O devices 18 which is interconnected with other nodes within a multi-node system through interconnected buses 19. FIG. 2 illustrates a conventional multi-node system 20 including a plurality remote nodes 21, 22, 23 and 24 and a plurality of interconnect buses 25 which connects the remote nodes 21, 22, 23 and 24, which follow a given coherency protocol.

While this interconnectivity increases the aggregate amount of shared cache within the system and increases the chance of finding a line within the shared level of cache, it also requires each cache to be searched, either in parallel or sequentially, depending on the interconnectivity of the processor stacks or nodes, before a hit or miss state of the line within the system can be determined. As a result, on a fetch operation extra latency is incurred while the search of each cache takes place, and can delay the launch of fetch operation to memory.

In order to overcome this problem, some SMP systems include speculative memory fetching, where the target/home memory is speculatively accessed while the state of line within the shared level of caches is determined within the system. Inasmuch, when the line does not exist in any of the shared caches, the leading edge memory access latency would be reduced by the amount of time required to poll the shared caches within the system. However, speculative memory fetching does not work well when contention is encountered on the line address within the system, because the speculative memory fetch has to be cancelled and the shared cache level polling sequence of the system needs to be restarted. This restarting/recycling of the cache polling includes relaunching the speculative memory fetch request.

Recycling of the shared cache search sequence increases the amount of aggregate memory requests within the system by a factor directly proportional to the amount of line contention encountered in the system. A system having minimal traffic would not notice any abnormal increase in memory traffic, however, a system experiencing high address contention would see the memory request rate grow exponentially with the amount of address contention in the system. Thus, the memory access rate would increase to a point where non-speculative memory access requests would be locked out by the volume of speculative memory fetch requests with the system, until the contention is resolved which increases the aggregate amount of latency incurred by the operation.

SUMMARY OF THE INVENTION

An exemplary embodiment includes a method of preventing lockout and stalling conditions in a multi-node system having a plurality of nodes. The method includes initiating a processor request to a shared level of cache in the requesting node, performing a fabric coherency establishment sequence on a plurality of nodes, issuing a speculative memory fetch request to the target memory, and cancelling the speculative memory fetch request issued and repeating the fabric coherency establishment sequence within the system upon detecting a remote address conflict, until a state of line is determined within the system, without issuing another speculative memory fetch request. Another (i.e. a recycled) memory fetch request may only be issued after determining the state of line within the system which occurs after completion of the shared cache level polling sequence amongst the remote nodes.

A system and a computer program product corresponding to the above-zed summarized method is also described and claimed herein.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 3:
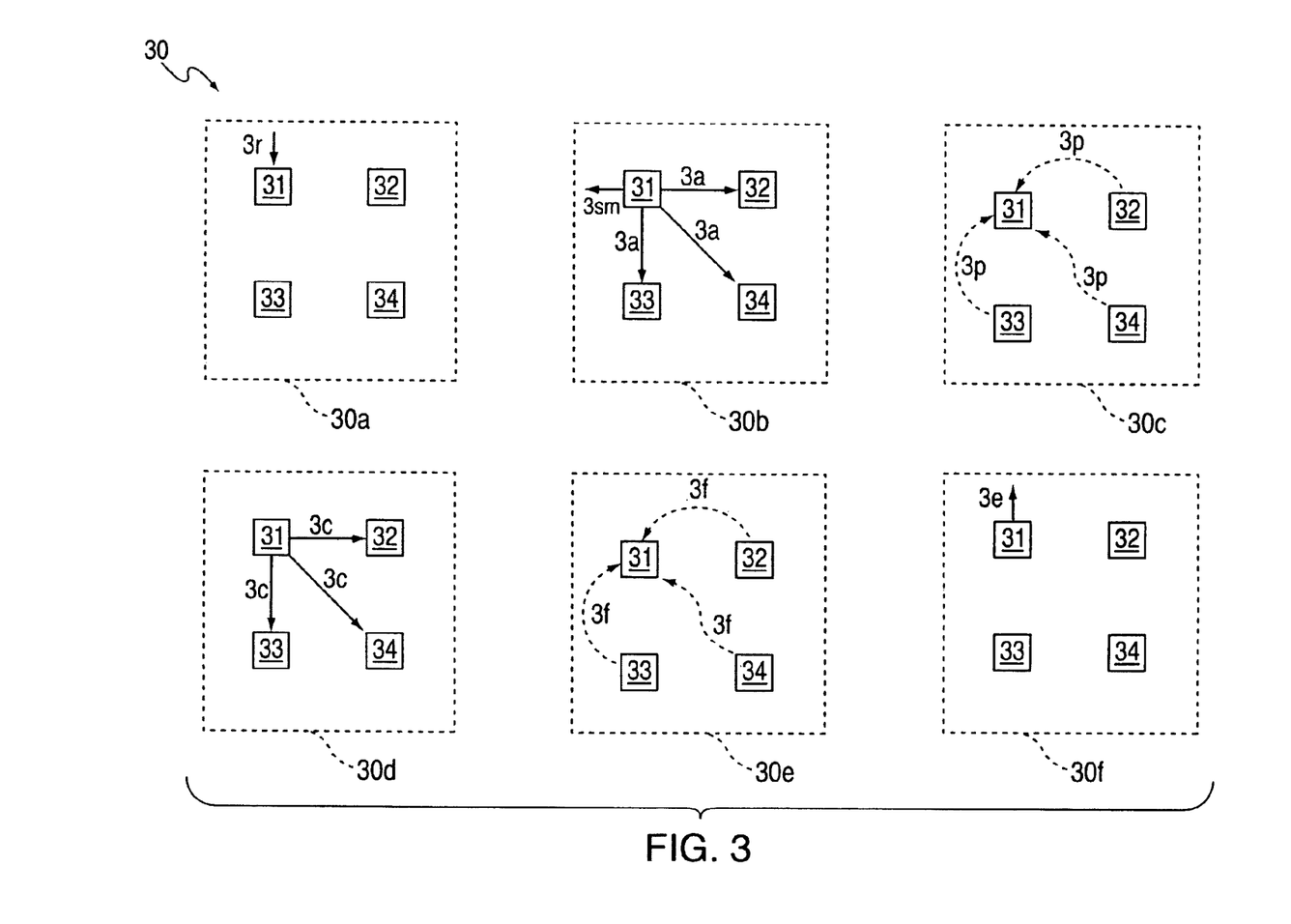
FIG. 3 is a diagram illustrating a multi-node system that can be implemented within embodiments of the present invention.

Turning now to the drawings in greater detail, it will be seen that in FIG. 3 there is a multi-node system 30 comprising a plurality of remote nodes 31, 32, 33 and 34. As shown in block 30a, an initial processor request 3r which is a memory request from a processor that is sent to a shared level of cache in node 31 of the multi-node system 30. When the initial processor request 3r encounters a local cache miss, in block 30b, a request (i.e., an address broadcast) 3a is launched to each of the remaining nodes 32, 33 and 34. The address broadcast 3a broadcasts the fetch command and address of the requesting node 31 to each of the remote nodes in the system 30. In the current exemplary embodiment, after launching the address broadcast 3a, a speculative memory fetch request 3sm is sent to a target memory (see memory 17 of FIG. 1, for example), of the system 30. However, the present invention is not limited hereto, the speculative memory fetch request 3sm may occur on any remote node shortly after the initial processor request 3r polls a remote directory state, which may occur around the same time as a partial response 3p (to be discussed below).

In block 30b, upon entering each node 32, 33 and 34, the address broadcast 3a searches a directory state of the remote cache of each node 32, 33 and 34 to determine the state of the target line's address in the remote cache, this process is referred to as a "shared cache level polling sequence".

Upon completion of the remote directory search, in block 30c, each remote node 32, 33 and 34 sends a partial response 3p back to the requesting node 31 including information indicating the state of the line in respective remote caches thereof such as exclusive line hit, read only line hit or a cache miss, for example. In block 30d, the requesting node 31 then takes each of the partial responses 3p and merges them into a combined response 3c, which indicates the coherent state for a given address/line in the system, and broadcasts the combined response 3c to each of the remote nodes 32, 33 and 34. Upon receiving the combined response 3c, each of the remote nodes 32, 33 and 34 manages their respective local cache states to ensure that upon completing processing of their respective requests, the state of the line with the system 30 is coherently managed. The process of launching address broadcast 3.a to the nodes 32, 33 and 34, sending partial response 3p back from each of the nodes 32, 33 and 34 and combining the partial responses 3p and broadcasting the combined response 3c to the nodes 32, 33 and 34, for the purpose of illustration, is referred to as a "fabric coherency establishment sequence".

When the coherent handling of the line within the respective remote nodes 32, 33 and 34 is completed, in block 30e each remote node 32, 33 and 34 sends a final response 3f back to the requesting node 31. After receiving the final responses 3f from each of the remote nodes 32, 33 and 34, in block 30f the requesting node 31 is then assured that system coherency has been obtained and exclusivity of the target line 3e can be returned to the requesting processor (detailed in FIG. 1, see processors 11-15, for example).

Figure 4:
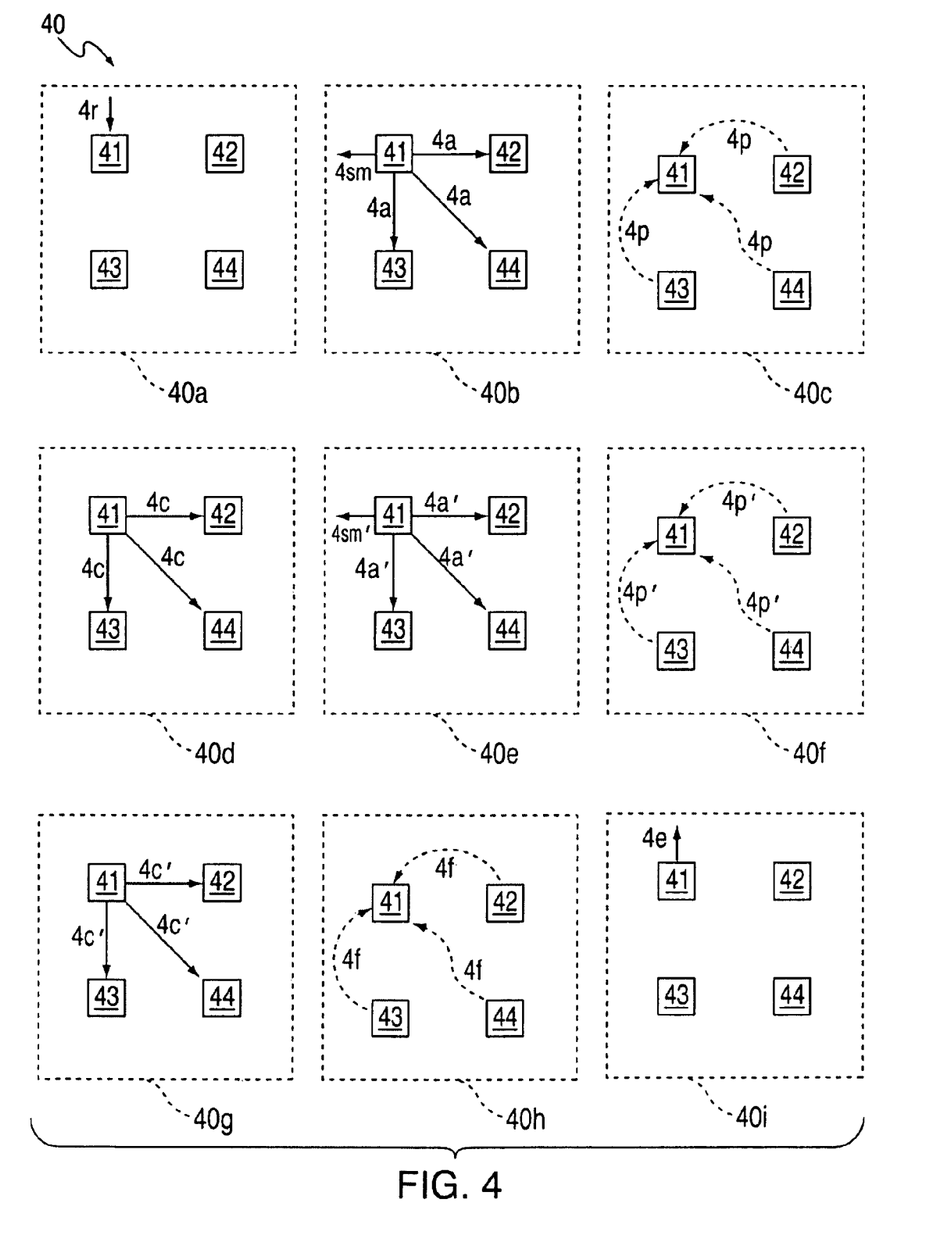
FIG. 4 is a diagram illustrating a multi-node system that can be implemented within embodiments of the present invention.

FIG. 4 is a diagram illustrating a variant of the fabric coherency establishment sequence within a multi-node system that exists within the embodiment of the present invention. FIG. 4 illustrates a multi-node system 40 comprising a plurality of remote nodes 41, 42, 43 and 44. In block 40a, an initial processor request 4r is sent to a shared level of cache in node 41 of the multi-node system 40. When the initial processor request 4r encounters a cache miss, a fabric coherency establishment sequence as described in FIG. 3, is performed on the nodes 41-44 and shown in blocks 40b, 40c, and 40d, therefore a detailed description thereof has been omitted.

The multi-node system 40 of FIG. 4 differs from the multi-node system 30 of FIG. 3, in that upon detecting a remote address conflict through information indicated in the combined response 4c, the speculative memory fetch request 4sm is cancelled and the fabric coherency establishment sequence is repeated to determine when the point of contention has been resolved in the system 40. As shown in FIG. 4, in block 40e a recycling process of takes place, where another (i.e., a recycled) speculative memory fetch request 4sm' is sent to the memory after address broadcasts 4a' is sent to the remote nodes 42, 43 and 44. Then, following another directory search, in block 40f each of the remote nodes 42, 43 and 44 sends a partial response 4p' back to the requesting node 41. In block 40g, the partial responses 4p' are combined by the requesting node 41 and a combined response 4c' is sent to each of the remote nodes 42, 43 and 44. If the point of contention has been resolved, then in block 40h final responses 4f from each of the remote nodes 42, 43 and 44 are sent back to the requesting node 41 and the requesting node 41 is then assured that system coherency has been obtained. In block 40i, the target line 4e is returned to the requesting processor. This recycling of the fabric coherency establishment sequence illustrated in FIG. 4 may occur indefinitely, depending upon the traffic within the system.

It is worth noting that as shown in FIG. 4, the initial processor request 4r results in multiple uses of the node interconnect buses 4a and 4a', as well as multiple speculative memory fetches 4sm and 4sm' (see blocks 40b and 40e), for example. In addition, the polling of the shared cache directories is repeated in order to ensure coherent management of the state of line in the system 40 and cannot be avoided. The speculative memory fetch request on the other hand can be prevented as the line address conflict being encountered is most likely from another fetch request that either hit in a remote cache or is in process of installing it within another shared cache in the system 40.

Figure 5:
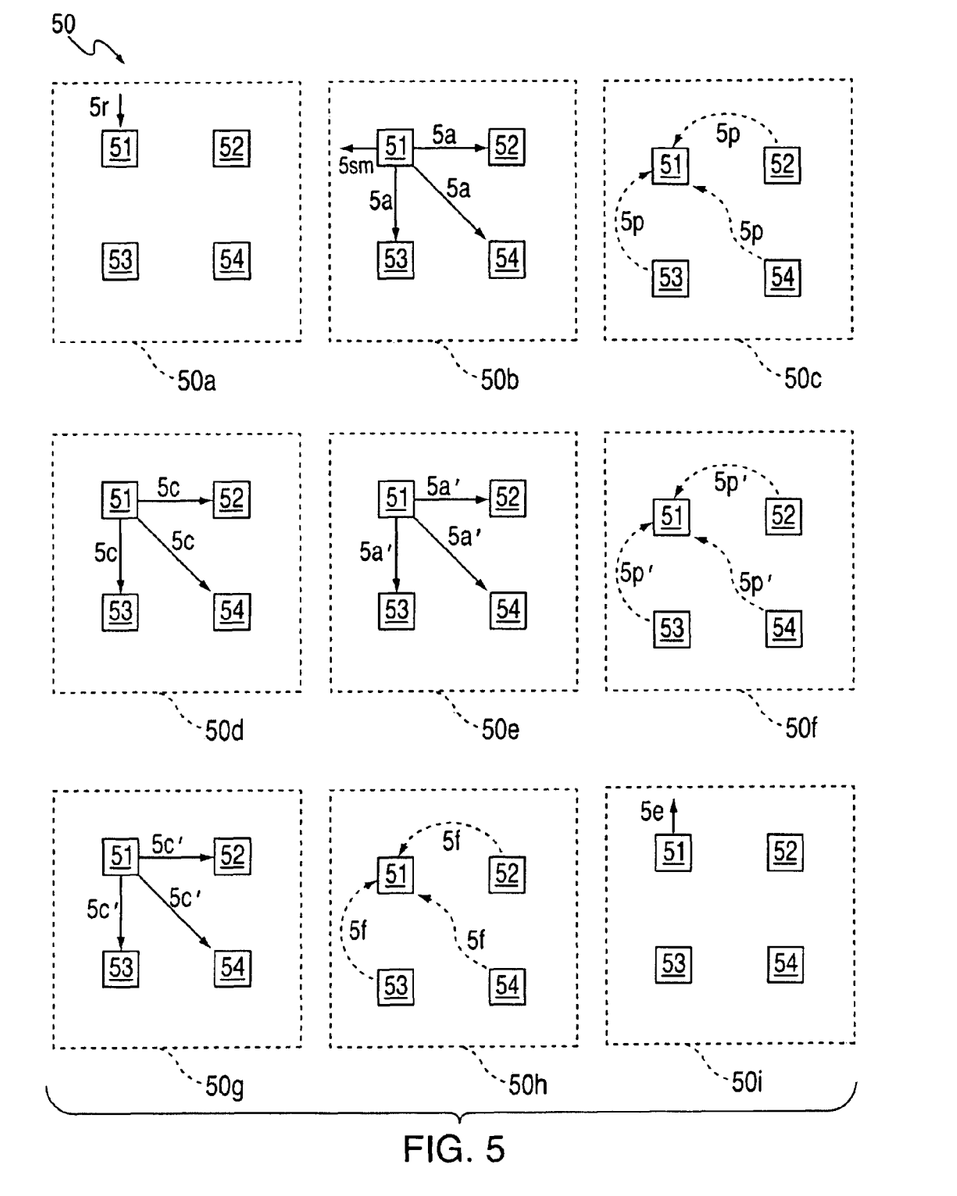
FIG. 5 is a diagram illustrating a multi-node system that can be implemented within embodiments of the present invention.

FIG. 5 is a diagram illustrating another multi-node system that can be implemented within embodiments of the present invention. In FIG. 5, a multi-node system 50 comprises a plurality of remote nodes 51, 52, 53 and 54. In block 50a, an initial processor request 5r is sent to a shared level of cache in node 51 of the multi-node system 50.

When the initial processor request 5r encounters a cache miss, then a fabric coherency establishment sequence is performed, as previously described. In block 50b, an address broadcast 5a to each of the remaining nodes 52, 53 and 54. In the current exemplary embodiment, shortly after launching the address broadcast 5a, a speculative memory fetch request 5sm is sent to a target memory (not shown) of the system. Following performance of a shared cache level polling sequence as described with reference to FIGS. 3 and 4, in block 50c each remote node 52, 53 and 54 sends a partial response 5p back to the requesting node 51 including information indicating the state of the line in respective remote caches thereof. In block 50d, the requesting node 51 broadcasts a combined response 5c to each of the remote nodes 52, 53 and 54, based upon the partial response 5p received from each of the nodes 52, 53 and 54.

According to the current exemplary embodiment of the present invention, if a line of contention is detected, the fabric coherency establishment sequence is repeated (see blocks 50e through 50g) without reissuing another (i.e., a recycled) memory fetch request. That is, the requesting node 51 issues an address broadcast 5a' to each of the nodes 52, 53 and 54 in block 50e, and the nodes 52, 53 and 54 each return a partial response 5p' back to the requesting node 52 in block 50f. The requesting node 51 then combines the partial responses 5p' received into a combined response 5c' and sends the combined response 5c' to the nodes 52, 53 and 54 in block 50g. This sequence is repeated until the line address contention is resolved. If the point of contention has been resolved, then in block 50*h* final responses 5*f* from each of the remote nodes 52, 53 and 54 are sent back to the requesting node 51 and the requesting node 51 is then assured that system coherency has been obtained. In block 50*i*, the state of the target line 5*e* is returned to the requesting processor.

Thus, as shown in FIG. 5, in block 50*e*, upon recycling the fabric coherency establishment sequence another (i.e., recycled) speculative memory fetch request is not required. Thus, by preventing this recycled speculative memory fetch request from being initiated, the utilization of the memory subsystem resources within the system 50 is reduced and unnecessary speculative memory fetch requests are prevented.

Figure 6:
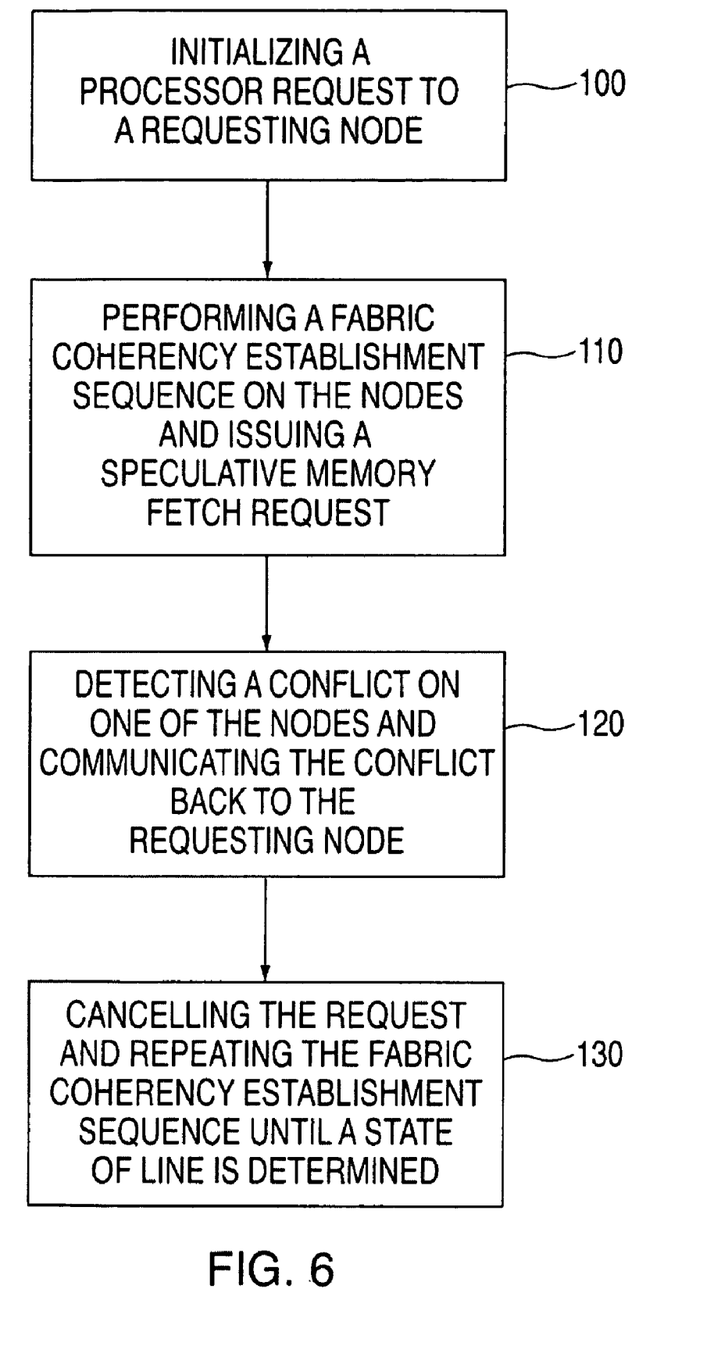
FIG. 6 is a flowchart illustrating a method of preventing lockout and stalling conditions in a multi-node system that can be implemented within embodiments of the present invention.

FIG. 6 is a flowchart illustrating a method of preventing lockout and stalling conditions in the multi-node system 50 as shown in FIG. 5. In FIG. 6, the process begins at operation 100, where an initial processor request 5*r* is sent to a requesting node 51. From operation 100, the process continues to operation 110, where a fabric coherency establishment-sequence is performed on the plurality of nodes, after detecting a local shared cache miss, as previously described with reference to FIG. 5. The performance of the fabric coherency establishment sequence includes launching an address broadcast 5*a* to the nodes 52-54, returning partial response 5*p* from the nodes 52-54 to the requesting node 51, and issuing a combined response 5*c* to the nodes 52-54. In addition to performing the fabric coherency establishment sequence, a speculative memory fetch request 5*sm* is also issued either before, concurrently, or shortly after launching the address broadcast 5*a*. From operation 110, the process moves to operation 120, where a conflict is detected on one of the nodes 52-54 and the conflict is communicated back to the requesting node 51. From operation 120, the process moves to operation 130 where the speculative memory fetch request issued 5*sm* is cancelled, and the fabric coherency establishment sequence is repeated within the system upon detecting the conflict, until the point of line/address contention within the system is resolved, without issuing another (i.e., recycled) speculative memory fetch request. That is, as shown in FIG. 5, the issuing of address broadcast 5*a*' to the nodes 52-54, sending a partial response 5*p*' back to the requesting node 51 and issuing a combined response 5*c*' to the nodes 52-54 is repeated without issuing another speculative memory fetch request.

According to an exemplary embodiment of the present invention, another (i.e., recycled) memory fetch request (not shown) is issued only after determining the state of line within the system, which occurs after completion of the shared cache level polling sequence, and the state of the line within the system is found to be a "Miss" (ie. the line does not exist in any of the caches within the system and hence must be sourced from memory). In doing so, the method according to exemplary embodiments of the present invention, prevents unnecessary speculative memory fetch requests and potential lockout conditions, while memory resources are kept more available for shared cache miss requests that are occurring within the system.

Embodiments of the present invention create a method which prevents request lockout conditions such that in a case where line address contention is detected, the speculative memory fetch request is only reissued after the state of the line within the system is determined and the shared cache level polling sequence is completed. An exemplary embodiment provides a solution which prevents unnecessary reissuing of speculative memory fetch requests within the system and the lockout conditions that may be created when address contention is encountered by a given request, therefore, enabling normal latency and the performance improvements found through the speculative memory fetch algorithm.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of preventing lockout and stalling conditions in a multi-node system having a plurality of nodes, the method comprising:

initiating a processor request to a shared level of cache in a requesting node;

performing a fabric coherency establishment sequence on the plurality of nodes by sending a request from the requesting node to remaining nodes when the processor request encounters a conflict, and performing a search of each remaining node and sending responses to the requesting node from each remaining node and combining the responses at the requesting node, and issuing a speculative memory fetch request to a memory;

detecting a conflict on one of the plurality of nodes and communicating the conflict back to the requesting node within the system; and canceling the speculative memory fetch request issued and repeating the fabric coherency establishment sequence in the system without reissuing the speculative memory fetch request.

2. The method of claim 1, wherein performing a fabric coherency establishment sequence further comprises:

sending an address broadcast from the requesting node to remaining nodes when the initiated processor request encounters a cache miss, performing a shared cache level polling sequence on the remaining nodes, and sending a partial response from each of the remaining nodes to the requesting node, and broadcasting a combined response to each of the remaining nodes based upon a combination of the partial responses.

3. The method of claim 2, wherein canceling the speculative memory fetch request issued, and repeating the fabric coherency establishment sequence within the system is performed based on detecting the remote conflict in the combined response.

4. The method of claim 2, wherein sending an address broadcast comprises broadcasting a command and address from the requesting node to each of the remaining nodes in the system.

5. The method of claim 2, wherein performing a shared cache level polling sequence comprises searching a directory state of remote caches of the remaining nodes to determine the state of a target line's address in all of the remote caches.

6. The method of claim 5, wherein each partial response includes information indicating the state of the target line in the respective remote caches.

7. The method of claim 6, wherein the combined response represents a coherent state of the target line in the system.

8. The method of claim 7, further comprising:
managing the remaining nodes based on information included in the combined response received from the requesting node;
sending a final response from the remaining nodes to the requesting node; and
forwarding the state of target line information back to a requesting processor from which the initial processor request was received.

9. The method of claim 8, further comprising issuing another speculative memory fetch request only after determining the state of line within the system and completion of the shared cache level polling sequence.

10. A computer program product comprising a computer useable medium including a computer readable program, wherein the computer readable program when executed on a computer causes the computer to implement a method of preventing lockout and stalling conditions in a multi-node system having a plurality of nodes, the method comprising:
sending an initial processor request to a shared level of cache in a requesting node;
performing a fabric coherency establishment sequence on the plurality of nodes by sending a request from the requesting node to remaining nodes when the processor request encounters a conflict, and performing a search of each remaining node and sending responses to the requesting node from each remaining node and combining the responses at the requesting node;
issuing a speculative memory fetch request to a memory, and canceling the speculative memory fetch request issued and repeating the fabric coherency establishment sequence within the system upon detecting a remote conflict until a point of contention within the system is resolved, without issuing another speculative memory fetch request.

11. The computer program product of claim 10, wherein performing a fabric coherency establishment sequence further comprises:
sending an address broadcast to remaining nodes of the plurality of nodes when the initial processor request encounters a cache miss, and performing a shared cache level polling sequence on the remaining nodes; and
sending a partial response from each of the remaining nodes to the requesting node after performing the shared cache level polling sequence, and broadcasting a combined response to each of the remaining nodes based upon a combination of the partial responses.

12. The computer program product of claim 11, wherein cancelling the speculative memory fetch request issued, and repeating the fabric coherency establishment sequence within the system is performed based on detecting the remote address conflict included information in the combined response.

13. The computer program product of claim 11, wherein sending an address broadcast comprises broadcasting a fetch command and address of the requesting node to each of the remaining nodes in the system.

14. The computer program product of claim 11, wherein performing a shared cache level polling sequence comprises searching a directory state of a remote cache of the remaining nodes to determine a state of a target line's address in the remote cache.

15. The computer program product of claim 14, wherein each partial response includes information indicating the state of the target line in the respective remote caches.

16. The computer program product of claim 15, wherein the combined response represents a coherent state of the target line in the system.

17. The computer program product of claim 16, wherein the method further comprises:
managing the remaining nodes based on information included in the combined response received from the requesting node;
sending a final response from the remaining nodes to the requesting node; and
forwarding state of target line information back to a requesting processor of the initial processor request received.

18. The computer program product of claim 17, wherein the method further comprises issuing another speculative memory fetch request only after determining a state of line within the system and completion of the shared cache level polling sequence.

19. A multi-node system comprising:
a first node; and
one or more second nodes, the first node receiving a memory request and issuing a speculative memory fetch request to a memory, and a fabric coherent establishment sequence being performed between the first node and the one or more second nodes wherein the first node sends a request to the one or more second nodes, and a search is conducted at the one or more second nodes, the one or more second nodes sending responses back to the first node and the responses are combined at the first node, and upon detecting a remote address conflict, the speculative memory fetch request being cancelled and the fabric coherency establishment sequence being continuously repeated within the system until a state of line is determined, without issuing another speculative memory fetch request.

20. The multi-node system of claim 19, wherein the fabric coherent establishment sequence further comprises the first node launching an address broadcast to the one or more second nodes to perform a shared cache level polling sequence on the one or more second nodes, the one or more second nodes returning a partial response to the first node, and the first node issuing a combined response based on the partial responses.

* * * * *